(12) United States Patent
Homan et al.

(10) Patent No.: US 6,973,300 B1
(45) Date of Patent: Dec. 6, 2005

(54) INTELLIGENT WIRELESS TERMINAL WITH VIRTUAL MEMORY

(75) Inventors: Andrew Homan, Stittsville (CA); Peter Gale, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/220,016

(22) Filed: Dec. 23, 1998

(51) Int. Cl.[7] .............................................. H04M 3/00
(52) U.S. Cl. .................. 455/419; 455/414.1; 455/420; 709/216
(58) Field of Search .................. 455/575, 550, 455/419, 556, 557, 456, 414, 186.1, 418, 455/420, 456.1, 414.1, 556.1; 340/905, 825.44, 340/752, 7.29, 5.73, 9.5, 7.52; 709/227, 263, 709/217, 218, 219, 216, 203, 208; 379/110.01

(56) References Cited

U.S. PATENT DOCUMENTS

| | | | |
|---|---|---|---|
| 4,688,020 A * | 8/1987 | Kuehneman et al. .. | 340/825.34 |
| 4,812,843 A * | 3/1989 | Champion, III et al. .... | 340/905 |
| 4,844,637 A * | 7/1989 | Buisson et al. ............... | 341/23 |
| 4,887,308 A * | 12/1989 | Dutton ..................... | 455/156.1 |
| 5,131,020 A * | 7/1992 | Liebesny et al. ........... | 455/422 |
| 5,418,837 A * | 5/1995 | Johansson et al. .......... | 455/558 |
| 5,491,838 A * | 2/1996 | Takahisa et al. .............. | 455/66 |
| 5,535,428 A * | 7/1996 | King et al. ................ | 455/38.4 |
| 5,579,535 A * | 11/1996 | Orlen et al. ................. | 455/421 |
| 5,598,534 A * | 1/1997 | Haas .......................... | 712/219 |
| 5,673,322 A | 9/1997 | Pepe et al. ..................... | 380/49 |
| 5,684,859 A * | 11/1997 | Chanroo et al. ........... | 455/11.1 |
| 5,689,547 A * | 11/1997 | Molne ......................... | 379/379 |
| 5,732,074 A * | 3/1998 | Spaur et al. ................. | 370/313 |
| 5,751,798 A * | 5/1998 | Mumick et al. ........... | 379/112 |
| 5,754,774 A | 5/1998 | Bittinger et al. ............ | 395/200 |
| 5,771,353 A * | 6/1998 | Eggleston et al. .......... | 709/227 |
| 5,797,091 A * | 8/1998 | Clise et al. .................. | 455/404 |
| 5,887,254 A * | 3/1999 | Halonen ...................... | 455/419 |
| 5,911,121 A * | 6/1999 | Andrews ..................... | 455/418 |
| 5,974,238 A * | 10/1999 | Chase, Jr. ............... | 395/200.78 |
| 5,991,760 A * | 11/1999 | Gauvin et al. ................ | 707/10 |
| 6,011,976 A * | 1/2000 | Michaels et al. ............ | 455/466 |
| 6,049,711 A * | 4/2000 | Ben-Yehezkel et al. ..... | 455/414 |
| 6,052,797 A * | 4/2000 | Ofek et al. ..................... | 714/6 |
| 6,061,686 A * | 5/2000 | Gauvin et al. ................ | 707/10 |
| 6,087,956 A * | 7/2000 | Helferich ............... | 340/825.44 |
| 6,088,730 A * | 7/2000 | Kato et al. ................... | 709/227 |
| 6,104,924 A * | 8/2000 | Shirai ......................... | 455/418 |
| 6,108,554 A * | 8/2000 | Kawamoto .................. | 455/456 |
| 6,118,995 A * | 9/2000 | Perdomo .................... | 455/419 |

(Continued)

OTHER PUBLICATIONS

Nokia 900 Communicator, "www.nokia.com".

(Continued)

Primary Examiner—Charles N. Appiah (57) ABSTRACT

A wireless terminal with virtual memory for use in a wireless communications network and a method of using such a wireless terminal is provided. The wireless terminal comprises a transceiver for receiving and transmitting information over an active wireless link with the communications network, virtual memory to store information received over the wireless link with the communications network and display means to view the information stored in the virtual memory without requiring the active wireless link with the communications network. The method of using the wireless terminal with virtual memory comprises the steps of downloading data from a server over an active wireless link to the virtual memory of the wireless terminal and accessing the data stored in the virtual memory at the wireless terminal without requiring the active wireless link.

8 Claims, 7 Drawing Sheets

U.S. PATENT DOCUMENTS 6,122,530 A * 9/2000 Overy et al. ................. 455/566
6,125,285 A * 9/2000 Chavez, Jr. et al. ........ 455/557
6,807,415 B2 * 10/2004 Sato ........................... 455/420

OTHER PUBLICATIONS

Puma Technology, Inc., Press Releases, "www.pumatch.com".

Nancy Gohring, "Microsoft Invades Wireless Data", Telephony, Oct. 19, 1998 p. 6.

"The Companion Application Toolkit", Nortel Companion, Northern Telecom, Nov. 1997.

Nancy Gohring, "The Data Demon", Telephony, Oct. 26, 1998 p. 15.

* cited by examiner

INTELLIGENT WIRELESS TERMINAL WITH VIRTUAL MEMORY

FIELD OF THE INVENTION

This invention relates to a wireless terminal and in particular, to a wireless terminal and method of using the wireless terminal which reduce the wireless resources required.

BACKGROUND OF THE INVENTION

Wireless handsets (e.g. wireless telephones) for use in a building wireless communications network allow users (e.g. employees) to work away from their desks without the worry associated with missing incoming callers. The wireless handsets provide users with increased freedom and accessibility in the workplace.

A typical building wireless communications network typically comprises a central controller, base stations connected to the central controller, and wireless handsets. The central controller manages all incoming calls for the individual wireless handsets from other wireless handsets or from an in building telecommunication network. The central controller also manages all outgoing calls from the individual wireless handsets to other wireless handsets or to other called parties via the in building telecommunication network.

The building wireless communications network typically uses a pico-cellular architecture. That is, the typical building wireless communications network is divided into cells which service the wireless handsets in a defined area. Each cell contains a base station which communicates with each wireless handset located within the cells coverage area over an active wireless link, such as a radio channel. When a call arrives for a particular wireless handset, the central controller determines the cell location of the requested wireless handset and alerts the user with a notification alarm on the wireless handset. Once the call is answered, the central controller connects the wireless handset to the calling party. Many conventional building wireless communications networks only carry voice traffic.

As aforementioned, one key advantage of this system is the ability of an employee to work away from their work area while not missing incoming calls. A problem results from the fact that this inevitably increases the time the employee is away from his/her computer (e.g. a Personal Computer (PC)) and its associated applications and databases. This reduction in access to valuable resources can harm productivity and limit the true freedom gained by the use of the building wireless communications network.

There are presently available digital building wireless communications networks systems that carry not only voice traffic but also data traffic. A typical digital building wireless communications network typically comprises not only a central controller, base stations connected to the central controller and wireless handsets but also a server (e.g. a personal computer (PC)) connected to the central controller. The server runs one or more applications. A data session between a wireless handset and the server over an active wireless link allows a user of the wireless handset to access applications and related data located on the server remotely with the wireless handset. A data session may be initiated by the user or by one of the applications running on the server connected to the central controller. Samples of these systems include the Companion 200 and Meridian Companion Mobility Option (MCMO) produced by Northern Telecom Limited and the Pocket Communication Systems (PCS) PCS50E, PCS150E, and PCS2000E produced by SpectraLink Corporation. While the user is away from a PC, these digital building wireless communications networks allow for the activating and running of computer programs (i.e. applications) that may be required without prescribing that the user be situated at the same location as the computer (e.g. PC). This increases the accessibility of data to the user while away from a computer.

However, with existing communications systems, the data associated with an application is only stored at the server. The user must always establish a data session with the application over an active wireless link in order to access the data. Consequently, existing systems use up valuable radio resources which could ultimately lead to reduced system capacity and service degradation.

SUMMARY OF THE INVENTION

It is an object of the present invention to overcome the disadvantage of the prior art and, in particular, to provide a technique whereby a user is able to access data locally at a wireless handset for one or more software applications without requiring a wireless link.

In accordance with one aspect of the present invention, there is provided a method of accessing data at a wireless terminal having virtual memory. The method comprises the steps of (a) downloading data from a server over an active wireless link to the virtual memory of the wireless terminal and (b) accessing the data stored in the virtual memory of the wireless terminal at the wireless terminal without requiring the active wireless link.

In accordance with another aspect of the present invention, there is provided a wireless terminal for use in a communications network. The wireless terminal comprises a transceiver for receiving and transmitting information over an active wireless link with the communications network, virtual memory to store information received over the active wireless link with the communications network and display means to view the information stored in the virtual memory without requiring the active wireless link with the communications network.

In accordance with another aspect of the present invention, there is provided a wireless communications network. The wireless communications network comprises at least one display based wireless handset with virtual memory, at least one base station with which the wireless handset communicates over an active wireless link, a central switching controller coupled to the base station for controlling the base station and connectable to an external switched telephone network for selective switching of the wireless handset to the external switched network and a server connected to the central switching controller. The server controls operation of the central switching controller by means of server software running on the server and provides at least one software application to the wireless handset by means of application software and related data located on the server. The server software permits data related to an application to be downloaded over the active wireless link to the virtual memory of the display based wireless handset. The data stored in the virtual memory of the wireless handset can be accessed without the active wireless link.

BRIEF DESCRIPTION OF THE DRAWINGS

The preferred embodiment of the present invention will now be described with reference to the following figures, in which.

DETAILED DESCRIPTION OF THE PREFERRED EMBODIMENT

The preferred embodiment of the present invention requires the use of the Companion Applications Toolkit (CAT) Application Programming Interface (API) produced by Northern Telecom Limited of Montreal, Canada. This CAT API corresponds to Northern Telecom part number A0674796 and is publicly offered for sale by Northern Telecom. The software manual for this API is the CAT Version 1.1 help file using Microsoft Windows Help Application 4.00.950 and is incorporated herein by reference.

Figure 1:
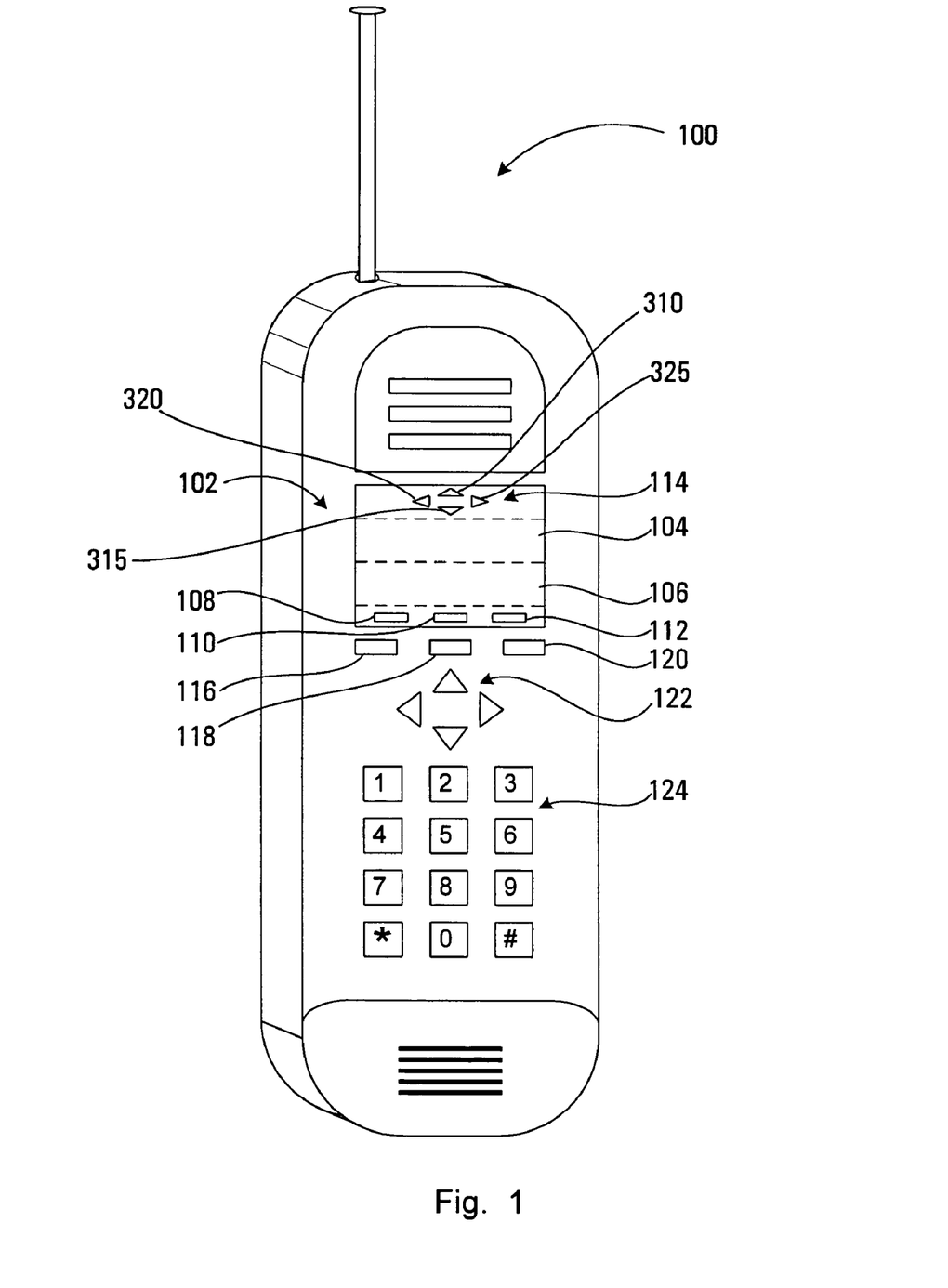
FIG. 1 is an illustration of a wireless handset in accordance with the preferred embodiment of the present invention.

FIG. 1 is an illustration of a wireless handset 100 in accordance with the preferred embodiment of the present invention which, as will be described herein below is software configurable to provide enhanced telephone services in a building wireless communications network carrying voice and data traffic. The wireless handset 100 is a type of wireless terminal. The features of the wireless handset 100 include a liquid crystal display (LCD) 102 with a first display line 104, a second display line 106, softkey icons 108, 110, 112, and navigational key (navkey) icons 114, softkey buttons 116, 118, 120, navkey buttons 122, and a dialpad 124.

Software created using the CAT API controls the writing to the LCD 102 and the turning on or off of the softkey icons 108, 110, 112 and the navkey icons 114. The process of turning on or off the softkey icons 108, 110, 112 and navkey icons 114 includes activation and deactivation of the corresponding softkey buttons 116, 118, 120 and navkey buttons 122. The softkey icons 108, 110, 112 include a first softkey icon (left) 108, a second softkey icon (middle) 110, and a third softkey icon (right) 112 that correspond respectively to a first softkey button (left) 116, a second softkey button (middle) 118, and a third softkey button (right) 120 located below the softkey icons 108, 110, 112 on the wireless handset 100. Typically the second display line 106 of the LCD 102 is used to label the softkey icons 108, 110, 112 that are activated by writing the appropriate labels directly above the particular softkey icons 108, 110, 112. (These labels may be called softkey labels). The navkey buttons 122 consist of an up navkey button 310, a down navkey button 315, a left navkey button 320 and a right navkey button 325.

Figure 2:
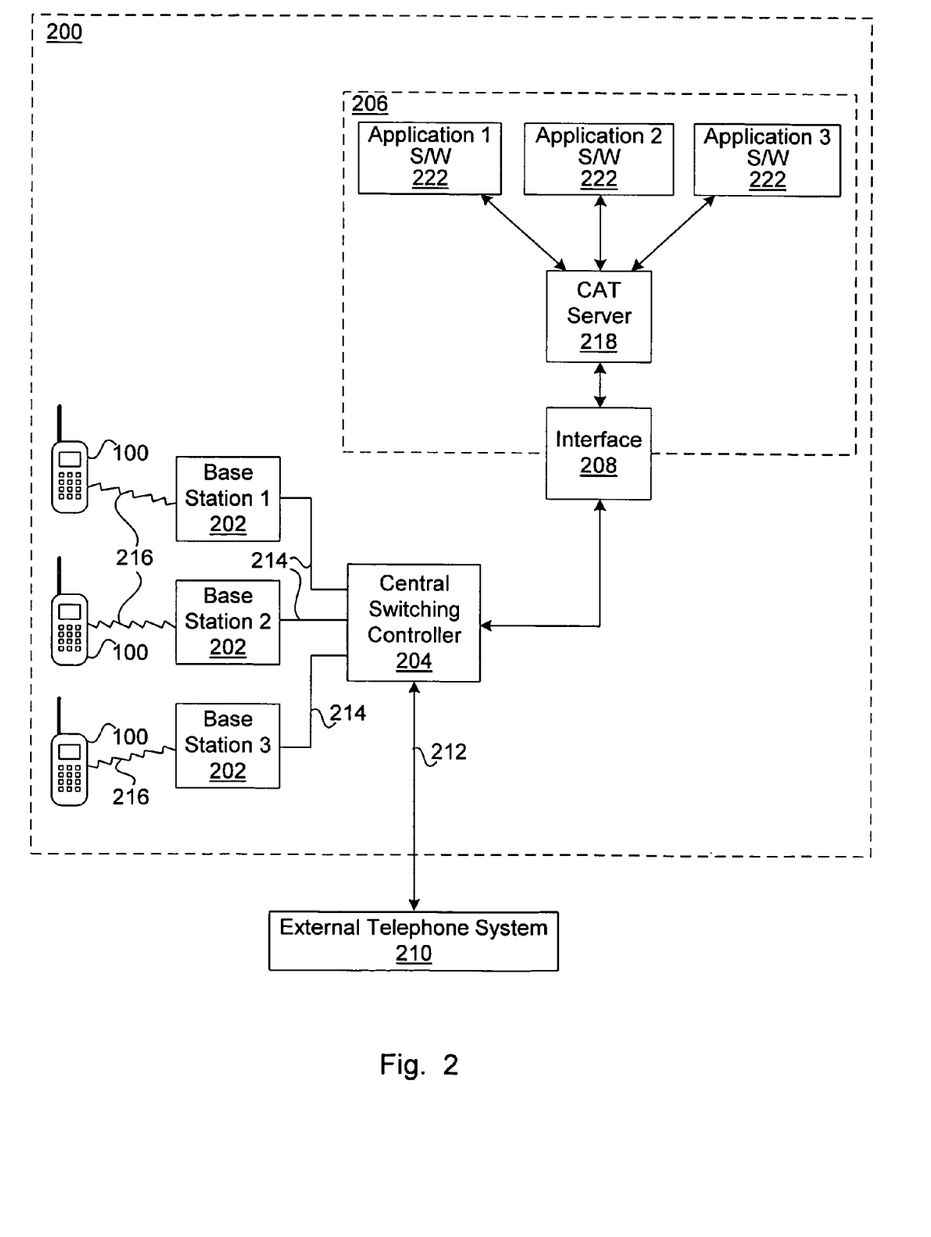
FIG. 2 is a block diagram of a building wireless communications network in accordance with the preferred embodiment of the present invention.

FIG. 2 is a block diagram of an in building wireless communications network 200 in accordance with the preferred embodiment of the present invention, consisting of a plurality of wireless handsets 100, a plurality of base stations 202, a central switching controller 204 and a server 206 connected to the controller 204 through an interface device 208. The server 206 is typically a personal computer. (Alternatively, other types of computers can be used, such as mini computers). The central switching controller 204, the plurality of base stations 202, and the plurality of wireless handsets 100 combined comprise the Companion 200 with Northern Telecom part number A0725269 in one embodiment and the Meridian Companion Mobility Option (MCMO) with Northern Telecom part number A0725270 in another embodiment. Both systems are produced by Northern Telecom Limited of Montreal, Canada.

The central switching controller 204 connects the building wireless communications network 200 to an external telephone system 210 through telephone lines 212. In the embodiment described above with the Companion 200, the external telephone system 210 consists of a Private Branch Exchange (PBX) which is further connected to a public switched telephone network and/or connected to PBXs of other telephone systems. In the embodiment described above with the MCMO, the central switching controller 204 is included within the PBX and the external telephone system 210 connected to the central switching controller 204 consists of a public switched telephone network and/or PBXs for other telephone systems.

The central switching controller 204 is connected to the wireless handsets 100 through Time Compressed Multiplexing (TCM) telephone lines 214 between the controller 204 and the base stations 202, and active wireless links 216 between the base stations 202 and the wireless handsets 100. The active wireless links 216 are typically active radio channels. The wireless handsets 100 include transceivers for communicating with the base stations 202 over the active wireless links 216.

The interface device 208 is used to translate data information and requests in the TCM form to the RS232 form that the server 206 can process and translate data information and requests in the RS232 form to the TCM form that the central switching controller 204 can process. In the preferred embodiment, the interface device 208 is a Computer Telephony Adaptor (CTA) which consists of either a serial box CTA100 external to the server 206 with Northern Telecom part number A0646509 or a PC interface card CTA150 internal to the server 206 with Northern Telecom part number A0363108.

The server 206 runs server software comprising Companion Applications Toolkit (CAT) server software 218 and application software. The Companion Applications Toolkit (CAT) server software 218 communicates with and has the capability to control the central switching controller 204 and the wireless handsets 100 through the interface device 208 and regulates the operation of the application software. The application software comprises a plurality of software application programs 222 programmed with the CAT API.

An example of a possible software application program 222 generated with the CAT API is a personal directory look up application selectively initiated by the user of one of the wireless handsets 100 that allows the user to search a personal directory database located within the server 206 for information on specific individuals.

Another example of a possible software application program 222 generated with the CAT API is a To-Do list selectively initiated by the user of one of the wireless handsets 100 that allows the user of a wireless handset 100 to search a To-Do list database located at the server 206 for activities or work that needs to be performed by the user.

An additional example of a possible software application program 222 is a nurse call system application which initiates a data session with one or more of the wireless handsets 100 carried by the nurses within a hospital ward in the event of an emergency request by a patient and provides additional information about the particular patient such as his/her room number to the wireless handsets 100 in such an occurrence.

A further example of a software application program 222 is a stock inventory control application selectively initiated by the user of one of the wireless handsets 100 that allows the user to access inventory databases located in at the server 206 to determine if a product is in stock in a stock room or a warehouse.

The CAT server software 218 is 16 bit software which operates under Microsoft WINDOWS versions 3.1, 3.11, Win95 and Win98. This server software 218 is capable of being upgraded to 32 bit software which can be operated under Microsoft WINDOWS versions Win95, Win98, and WinNT.

Similarly, the software application programs 222 are 16 bit software which operates under Microsoft WINDOWS versions 3.1, 3.11, Win95 and Win98. The software application programs 222 are capable of being upgraded to 32 bit software which can be operated under Microsoft WINDOWS versions Win95, Win98, and WinNT.

Figure 3:
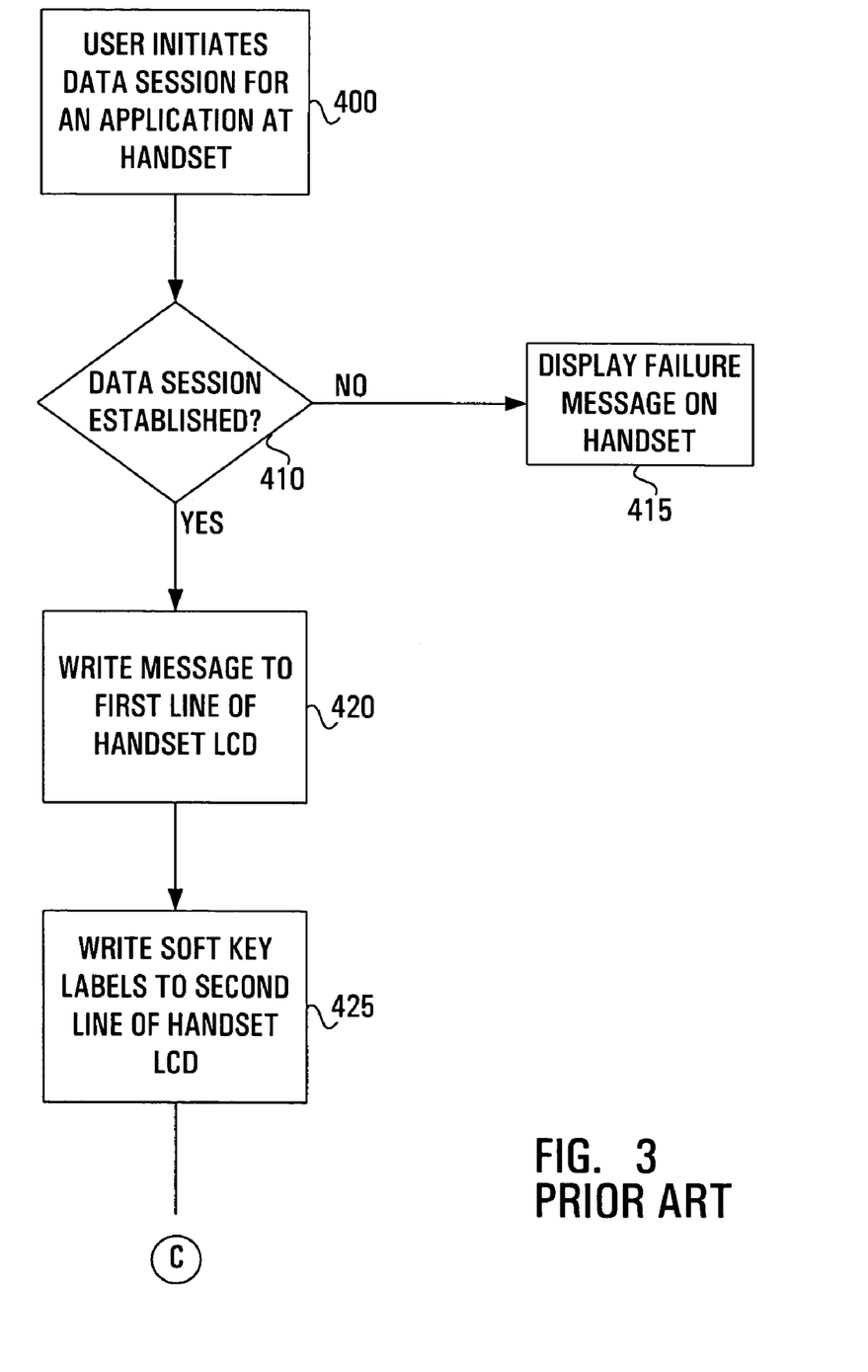
FIG. 3 is a flowchart illustrating the steps of a conventional method to handle a typical conventional data session.

Referring to FIG. 3, whenever a user wishes to access a software application program 222 and related data at the server 206, the user typically initiates a data session for the software application program 222 over an active wireless link 216 by pressing a softkey button 116, 118, or 120 on a wireless handset 100 for the software application program 222 as shown in step 400. If the wireless handset 100 is unable to establish a data session with the software application program 222 over an active wireless link 216, the wireless handset 100 typically displays a failure message (e.g. "connection failed") as shown at decision step 410 and step 415. For example, the wireless handset 100 will not be able to establish a data session if the wireless handset 100 is out of range or if the server 206 is down. If the wireless handset 100 is able to establish a data session with the software application program 222 over an active wireless link 216, the software application program 222 typically sends a message over the active wireless link 216 which is displayed on the wireless handset 100 as shown at decision step 410 and step 420. The content of the message is dependent on the software application program 222.

The software application program 222 then sends softkey labels for the softkey buttons 116, 118 and 120 over the active wireless link 216 which are displayed on the second line 106 of the LCD display 102 of the wireless handset 100 at step 425. The software application program 222 then turns on the softkey icons 108, 110 and 112 (which are displayed on the LCD 102) and activates the corresponding softkey buttons 116, 118 and 120 at step 430.

The wireless handset 100 then monitors whether a softkey button 116, 118 or 120 has been pressed as shown at decision step 435. If a softkey button 116, 118 or 120 has been pressed, then the wireless handset 100 sends a softkey event (i.e. a command) associated with the softkey button 116, 118 or 120 over the active wireless link 216 to the software application program 222 on the server 206 at steps 435 and 440. The softkey event associated with the first softkey button (left) 116 is typically called a first softkey event. The softkey event associated with the second softkey button (middle) 118 is typically called a second softkey event. The softkey event associated with the third softkey button (right) 120 is typically called a third softkey event. The software application program 222 then sends an appropriate response for the softkey event to the wireless handset 100 over the active wireless link 216 at step 445.

If the response notifies the wireless handset 100 that the data session be ended (e.g. the user requested the data session be ended at steps 435 and 440), then the data session is ended and the wireless link 216 is torn down as shown at decision step 450 and step 455. If the software application program 222 sends a response, other than a response to end the data session, the wireless handset 100 displays the response on the LCD 102 of the wireless handset 100 as shown at step 475. Next, the wireless handset 100 monitors the softkey buttons 108, 110 and 112 as shown at decision step 435.

For example, the software application program 222 may provide a To-Do list application. The To-Do list application informs each user of a wireless handset 100 of the activities that need to be performed by that user. The activities for each user are stored in a To-Do list stored at the server 206.

The user initiates a data session for the To-Do list application over an active wireless link at step 400 by pressing the appropriate softkey button 116, 118 or 120 on a wireless handset 100. Once the data session is established, the software application program 222 for the To-Do list application sends a message to the wireless handset 100 over the active wireless link 216 which is displayed on the wireless handset 100 as shown at steps 410 and 420. The message is typically a description of an activity to be performed first from the To-Do list stored on the server 206.

The To-Do list application then sends over the active wireless link 216 the following softkey labels for the softkey buttons 116, 118 and 120: "Next", "Prev" and "Quit". These soft key labels are displayed on the second line 106 of the LCD 102 of the wireless handset 100 at step 425. The To-Do list application then instructs the wireless handset 100 to turn on the softkey icons 108, 110 and 112 (and activates the corresponding softkey buttons 116, 118 and 120) at step 430.

The wireless handset 100 then monitors the softkey buttons 116, 118 and 120 at step 435. If the user presses the softkey button 116 (labelled "Next"), the wireless handset 100 sends the first softkey event to the software application program 222 (for the To-Do list application) over the active wireless link 216 at steps 435 and 440. The software application program 222 for the To-Do list application then interprets the first softkey event as a request to send the description for the next activity to be performed. The software application program 222 then sends the description for the next activity to be performed in the To-Do list at step 445. The description is then displayed on the LCD 102 at steps 450 and 475.

If the user presses the softkey button 118 (labelled "Prev"), the wireless handset 100 sends the second softkey event to the software application program 222 for the To-Do list application over the active wireless link 216 at steps 435 and 440. The software application program 222 for the To-Do list application then interprets the softkey event as a request to send the description for the previous activity in the To-Do list. The software application program 222 for the To-Do list application then sends over the active wireless link 216 the description for the previous activity to be performed in the To-Do list at step 445. The description is then displayed on the LCD 102 at steps 450 and 475.

If the user presses the softkey button 120 (labelled "Quit"), the wireless handset 100 sends the third softkey event to the software application program 222 for the To-Do list application over the active wireless link 216 at steps 435 and 440. The To-Do list software application then interprets the third softkey event as a request to end the data session. The software application program 222 then sends a response over the active wireless link 216 confirming that the data session be ended at step 445. The data session is then ended and the active wireless link 216 is torn down at steps 450 and 455.

As shown in FIG. 3, whenever the user wishes to access data related to a software application program 222, the user must establish a data session over an active wireless link 216 between a wireless handset 100 and the software application program 222. For many software applications, this method needlessly wastes radio resources.

In accordance with a preferred embodiment of the present invention, each wireless handset 100 has memory, called virtual memory, for one or more software application programs 222. (i.e. The software application programs 222 treat the memory in each wireless handset as virtual local memory). The virtual memory stores data related to one or more software application programs 222. Consequently, if a user wishes to access data for a software application program 222, the user typically does not typically need to establish a data session over an active wireless link 216 with the software application program 222. The user can simply access the data stored locally at the wireless handset 100 in the virtual memory. In the preferred embodiment, each handset 100 has 32 KB of RAM for the virtual memory. Alternatively, more or less than 32 KB can be used. Furthermore, other types of memory can be used such as EEPROM's, floppy disks, etc.

The data for a software application program 222 is typically stored as a plurality of items in a list in the virtual memory and depending on the software application program 222 may be stored as a respective plurality of items in a mirror list maintained on the server 206 for the software application program 222. For many software applications programs 222, the list in the virtual memory and the mirror list are identical. However, for some software application programs 222, the list and the mirror list may not always be identical. For example, some software application programs 222 may allow the user to add, modify or delete an item in the list stored in the virtual memory without requiring a data session over an active wireless link 216 to update the mirror list. Depending on the software application program 222, once a data session over the active wireless link 216 is established the data in the list and the data in the mirror list on the server 206 may or may not be synchronized.

Before the virtual memory in a wireless handset 100 can be used for a service or a software application (associated with a software application program 222), the software application must be added to the wireless handset 100 by the software application program 222. When the software application is added, the virtual memory is also configured. The user of the wireless handset 100 need not even be aware that the software application is being added by the software application program 222.

Figure 4:
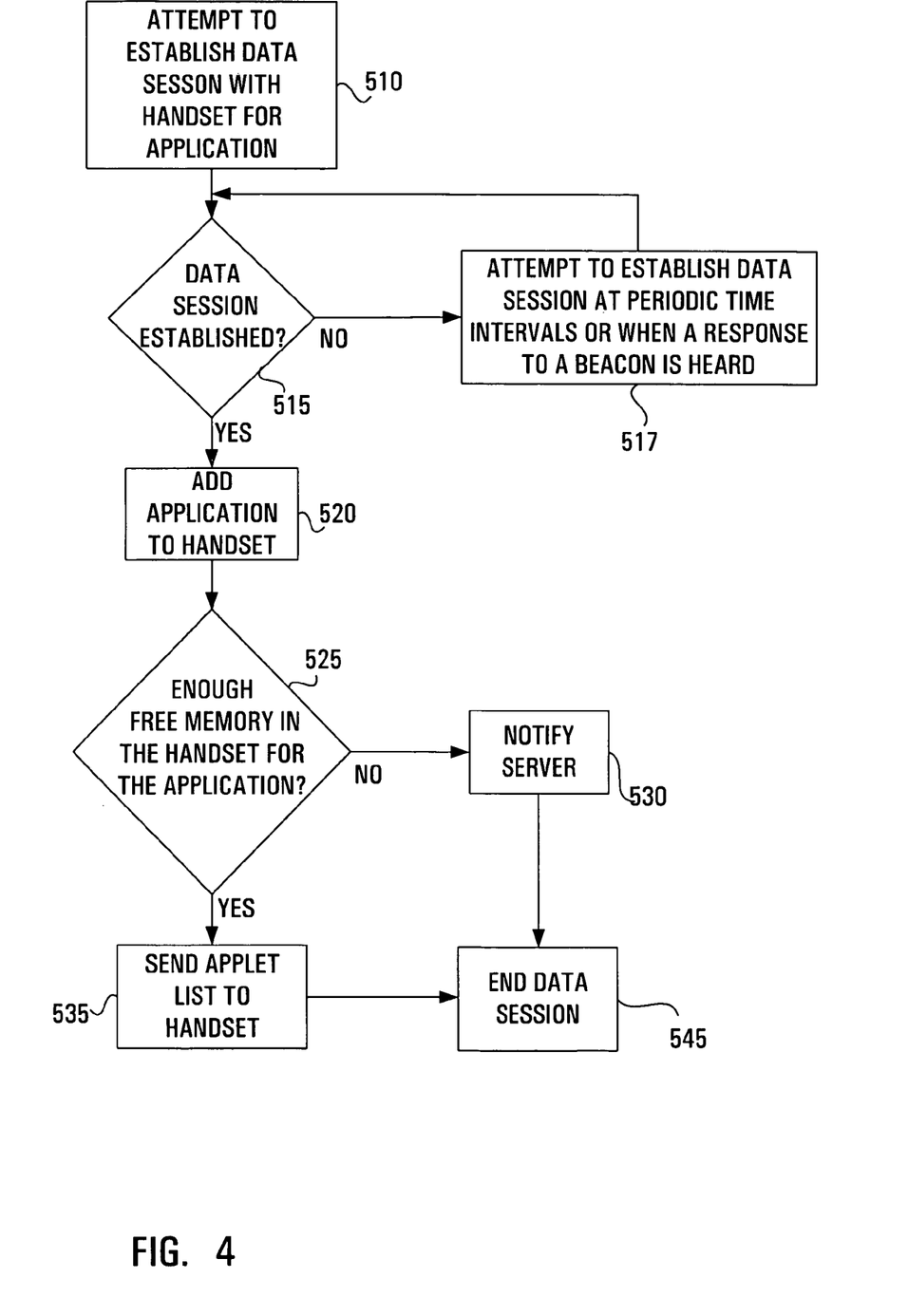
FIG. 4 is a flowchart illustrating the steps of a method to add a software application to a wireless handset in accordance with the preferred embodiment of the present invention.

Referring to FIG. 4, assuming there isn't an existing data session over an active wireless link 216, the server 206 attempts to establish a data session for the software application program 222 over an active wireless link 216 with the wireless handset 100 at step 510. If a data session for the software application program 222 over an active wireless link 216 cannot be established, the server 206 keeps trying to establish a data session for the software application program 222 over an active wireless link 216 with the wireless handset 100 at periodic time intervals or whenever the server 206 hears a response from the wireless handset 100 to a beacon sent by a base station 202 (which typically indicates that the wireless handset 100 is within range of one of the base stations 202) as shown at steps 515 and 517.

If a data session for the software application program 222 has been established at step 515, then the software application program 222 in the server 206 requests that the associated software application be added to the wireless handset 100 at step 520. At step 520, the software application program 222 typically sends an application feature code identifying the software application, a name (or description) of the software application and a size for the list to be stored in the virtual memory for the software application.

The size of the list is simply the number of items (or entries) in the list. The size of the list depends on the software application (associated with the software application program 222). Each entry in the list can hold up to a maximum number of characters (including numerals). Preferably, the maximum number of characters is 64 characters (or 64 bytes). If a larger LCD 102 is used, the maximum number of characters for each entry may be larger.

Alternatively, the size for the list may be specified by the software application program 222 as not only the number of items (or entries) in the list but also the maximum number of characters in each item (or entry).

At decision step 525, the wireless handset 100 determines whether it has enough free (or available) virtual memory in the wireless handset 100 to satisfy the needs of the software application. If there is not enough available virtual memory, the wireless handset 100 notifies the software application program 222 at step 530. If there is enough free virtual memory, the software application program 222 sends an applet list containing a number of applet identifiers and a respective number of associated softkey labels to the wireless handset 100 at step 535.

Each wireless handset 100 is preprogrammed with a fixed number of applets. Each applet is identified with a unique applet identifier. Each software application added by a software application program 222 uses at least one applet.

Alternatively, the software application program 222 sends the actual applets (i.e. programs) and associated softkey labels over an active wireless link 216 to the handset 100.

There are two types of applets—Type "A" and type "B" applets. Type "A" applets are programs which perform local functions that do not require a data session with a software application program 222 over an active wireless link 216. Most of the type "A" applets access the virtual memory in the wireless handset 100. Type "B" applets are programs which perform functions that require a data session over an active wireless link 216. At minimum, it is envisioned that each wireless handset 100 be preprogrammed with the following type "A" applets:

| APPLET IDENTIFIER | TYPICAL SOFTKEY LABEL | DESCRIPTION/FUNCTION |
| --- | --- | --- |
| A1 | Local Delete | Delete an item in the list in the Virtual Memory. |
| A2 | Quit | Quit list and return to main menu. |
| A3 | Connect | Establish a data session with the software application program 222 over a wireless link 216. |
| A4 | Display Next | Display next item in the list in the Virtual Memory. |
| A5 | Display Previous | Display previous item in the list in the Virtual Memory. |

-continued

| APPLET IDENTIFIER | TYPICAL SOFTKEY LABEL | DESCRIPTION/FUNCTION |
|---|---|---|
| A6 | Dial Number | Dial telephone number which is contained within the item displayed from the list in the Virtual Memory. |

At minimum, it is envisioned that each wireless handset 100 be preprogrammed with the following type "B" applets:

| APPLET IDENTIFIER | DESCRIPTION/FUNCTION |
|---|---|
| B1 | Establish data session with software application 222 program; Send first softkey Event. |
| B2 | Establish data session with the software application 222 program; Send second softkey event. |
| B3 | Establish data session with software application program 222; Send third softkey event. |

The softkey events depend on the service or software application (associated with the software application program 222). Examples of possible softkey events are as follows:

a) Establish data session with software application program 222; Once established, delete item in the list in the virtual memory associated with the software application program 222 and delete the same item in the mirror list stored on the server 206.

b) Establish data session with software application program 222; Once established, add an item in the list in the virtual memory associated with the software application program 222 and add the same item in the mirror list stored on the server 206.

c) Establish data session with software application program 222; Once established, insert an item in the list in the virtual memory associated with the software application program 222 and insert the same item in the mirror list stored on the server 206.

d) End existing data session for software application program 222.

Once the applet list has been sent to the wireless handset 100 at step 535 or once the software application program 222 has been notified at step 535, the data session is ended and the active wireless link 216 is torn down at step 545.

Data stored in the virtual memory of the wireless handset 100 for a software application may be added, modified or deleted without any user intervention by a software application program 222. An operator at the server 206 (or a client PC connected to the Server 206) may want to add, modify or delete data stored in the virtual memory of the wireless handset 100. For example, an operator at the server 206 may want to add a description for a new activity to the virtual memory of a wireless handset 100 for a To-Do list software application. Some software application programs 222 may even add, modify or delete data stored in the virtual memory of a wireless handset 100 on its own accord (i.e. without any intervention by an operator at the Server 206 (or at a client PC connected to the Server 206)).

Figure 5:
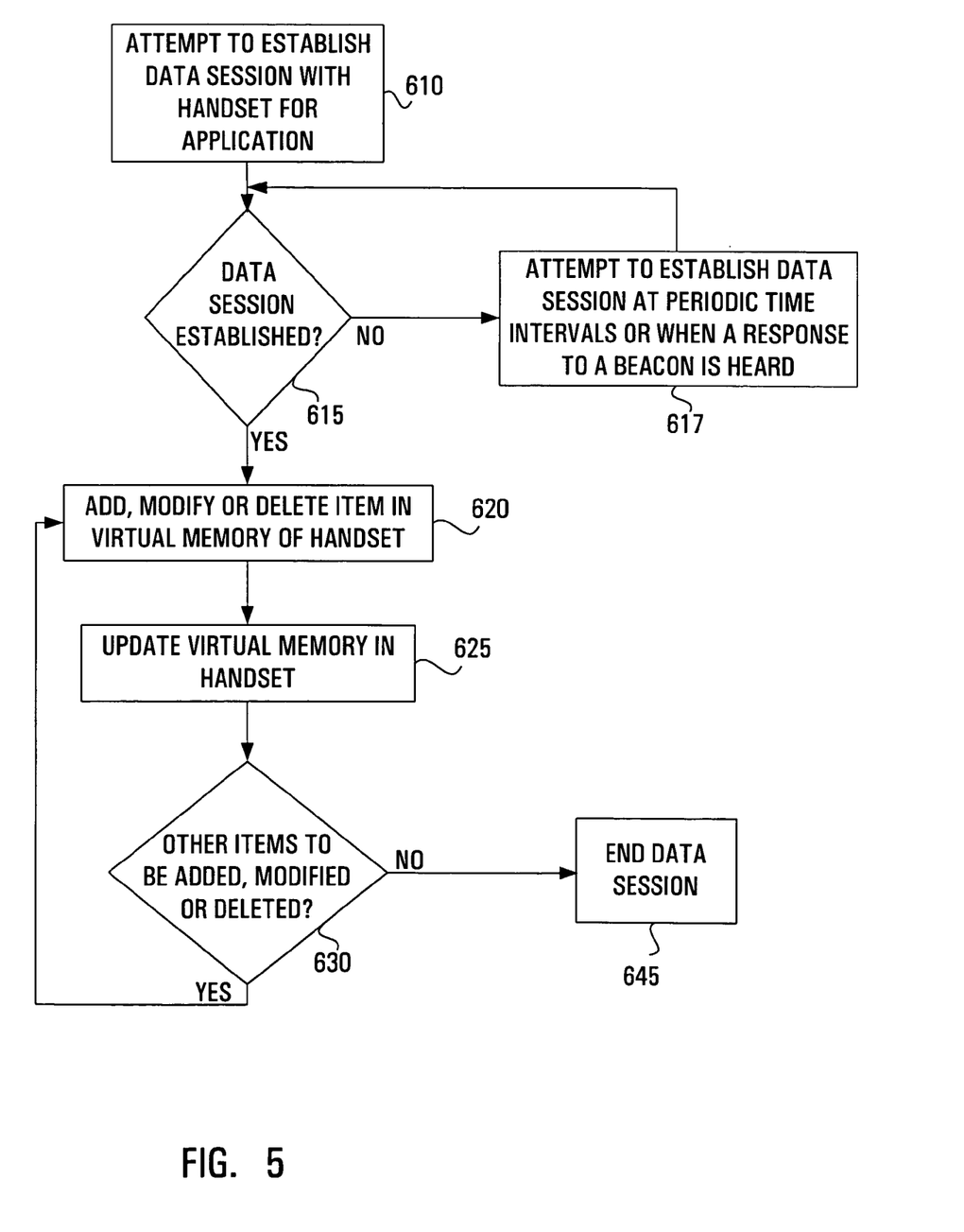
FIG. 5 is a flowchart illustrating the steps of a method to add an item, modify an item or delete an item in virtual memory of a wireless handset by a server in accordance with the preferred embodiment of the present invention; and, FIG. 6 is a flowchart illustrating the steps of a method to view, modify or delete data in the virtual memory of a wireless handset by a user in accordance with the preferred embodiment of the present invention.

Referring to FIG. 5, assuming there isn't an existing data session over an active wireless link 216, the server 206 attempts to establish a data session for a software application program 222 over an active wireless link 216 with the wireless handset 100 at step 610. If a data session for the software application program 222 over an active wireless link 216 cannot be established, the server 206 keeps trying to establish a data session for the software application program 222 over an active wireless link 216 with the wireless handset 100 at periodic time intervals or whenever the server 206 hears a response from the wireless handset 100 to a beacon sent by a base station 202 (which typically indicates that the wireless handset 100 is within range of one of the base stations 202) as shown at steps 615 and 617.

If a data session has been established at step 615, then the software application 222 in the server 206 sends a command to the wireless handset 100 requesting that an item be added, modified or deleted in the respective list in the virtual memory of the wireless handset 100 at step 620. The virtual memory is updated accordingly in step 625. Next, the software application 222 determines whether of not there are any other items to be added, modified or deleted in the respective list in the virtual memory at decision step 630. If there are other items to be added, modified or deleted, then steps 620 and 625 (and decision step 630) are repeated. If there aren't any other items to be added, modified or deleted, then the data session is ended and the active wireless link is torn down at decision step 640.

Whenever the user of a wireless handset 100 invokes a software application (associated with a software application program 222) that has been already added to the wireless handset 100, the wireless handset 100 displays the softkey labels provided in the applet list on the second line 106 of the LCD 102, displays the respective softkey icons 108, 110 and 112 and activates the respective softkey buttons 116, 118 and 120. Whenever the user presses the first softkey button 116, the user invokes the first applet provided in the applet list. Whenever the user presses the second softkey button 118, the user invokes the second applet provided in the applet list, etc. If the applet list contains more than three applet identifiers with respective softkey labels, the wireless handset displays the navkey icons 114 and activates the navkey buttons 122. By pressing the left navkey button 320 and the right navkey button 325, the user can scroll through the softkey labels for the other applets in the applet list and invoke the other applets if desired.

Figure 6:
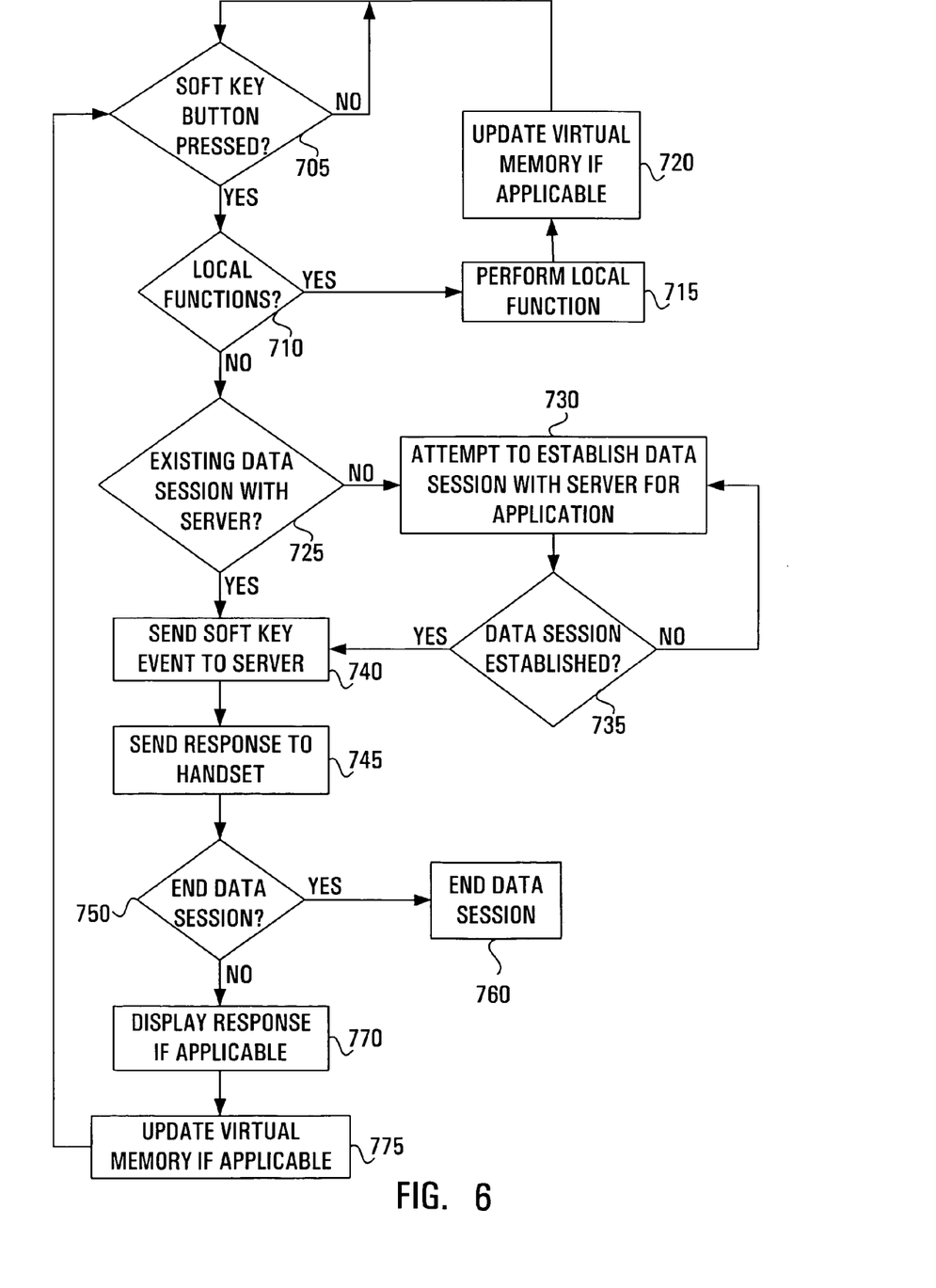

Referring to FIG. 6, the wireless handset 100 monitors whether a softkey button 116, 118 or 120 has been pressed at decision step 705. Once a softkey button 116, 118 or 120 has been pressed, the wireless handset 100 determines whether or not the associated applet performs a local function (i.e. a type "A" applet) or requires a data session over an active wireless link 216 (i.e. a type "B" applet) at step 710. If a type "A" applet was invoked, then the wireless handset 100 runs the applet at step 715. If the applet adds, modifies or deletes data in the virtual memory, then the virtual memory is updated accordingly at step 720. Then the wireless handset 100 monitors the softkey buttons 116, 118 and 120 at decision step 705 as previously described. If the wireless handset 100 determines that a type "B" applet was invoked at step 710, then the wireless handset 100 determines whether there is an existing data session for the associated software application 222 over the active wireless link 216 at step 725. If there isn't an existing active data session, then the wireless handset 100 attempts to establish a data session for the associated software application 222 over an active wireless link 216 at step 730. At step 735, the wireless handset 100 determines whether or not a data session for the software application program 222 has been established. If not, the wireless handset 100 continues to attempt to establish a data session for the associated software application program 222 over an active wireless link 216 at steps 735 and 730.

If a data session is established at step 735 or if there was already an existing data session at decision step 725 for the software application program 222, then the wireless handset 100 sends a softkey event (associated with the applet) to the software application 222 (e.g. a softkey event that would be interpreted by the software application program as 'delete an item') at step 740. The Software application then sends a response to the wireless handset 100 (e.g. display "item deleted" or end data session) at step 745. If the response to the wireless handset 100 indicates that the data session be ended, then the data session is ended and the active wireless link 216 is torn down. If the response does not indicate that the data session be ended, then the wireless handset displays the response, if applicable (e.g. item deleted) at step 770. Typically, a response is displayed. The response may display data sent from the server 206 for the associated software application 222 or may simply just confirm that a softkey event has been processed (e.g. item deleted). Next, the virtual memory is updated if applicable at step 775. For example, if an item is deleted, the item is not only deleted in the mirror list at the server 206 but is also typically deleted in the list in the virtual memory. Next, the wireless handset 100 monitors the softkey buttons 116, 118 and 120 at step 705 as previously described.

If an item from the virtual memory cannot be displayed all at once on the LCD 102, the wireless handset displays the navkey icons 114 and activates the navkey buttons 122. By pressing the up navkey button 310 and the down navkey button 315, the user can scroll through data for the item.

Persons skilled in the art will appreciate that there are alternative implementations and modifications possible to allow data to be stored and manipulated in virtual memory in a wireless handset 100 and that the above method is only an illustration of this embodiment of the invention.

In addition, the active wireless link 216 may not only be active radio channels but also may be any other type of active wireless link 216 such as an active infrared wireless link 216.

Furthermore, the wireless terminal with virtual memory and the method of using the wireless terminal 100 may be used in any type of wireless communications network such as a cellular phone wireless communications network.

Moreover, the wireless handset 100 is just one type of wireless terminal that can be used. Other types of wireless terminals can be used such as a wireless terminal comprising a personal computer with terminal software connected to a cellular telephone.

We claim:

1. A wireless terminal method comprising:
   (a) providing a memory on the wireless terminal which, in an on-line mode occurring when there exists a session over an active link between the wireless terminal and a server, is adapted to be treated as local virtual memory by an application program running on the server to read and write data in the virtual memory related to the application program; and
   (b) providing a local application program on the wireless terminal which, in an off-line mode occurring when there does not exist a session over an active link between the wireless terminal and the server, has read and write access to the data in the virtual memory;
   wherein in the off-line mode, when the application program running on the server modifies data at the server, the application program running on the server thereafter establishes a data session with the wireless terminal and updates corresponding data in the virtual memory, and when the local application program modifies particular data in the virtual memory, the local application program initiates a data session with the server and outputs a message to the server, the message comprising updates for at least some of the particular data.

2. A wireless terminal method in accordance with claim 1 further comprising providing an application program running on the server.

3. A wireless terminal method in accordance with claim 1 further comprising downloading applets from the server to the wireless terminal.

4. A server method comprising:
   providing an application program running on the server;
   the application program treating as local virtual memory a memory located on a wireless terminal while a connection between the server and the wireless terminal is established, with read and write access to the memory;
   while said connection is established and without wireless terminal user intervention, sending to the wireless terminal a local application program which when run by the wireless terminal allows the wireless terminal read and write access to data in the memory related to the application program while in an off-line mode occurring when there does not exist any connection between the server and the wireless terminal; and
   wherein in the off-line mode, when the application program running on the server modifies data at the server, the application program running on the server thereafter establishes a data session with the wireless terminal and updates corresponding data in the virtual memory, and when the local application program modifies particular data in the virtual memory the local application program initiates a data session with the server and outputs a message to the server, the message comprising updates for at least some of the particular data.

5. A server method in accordance with claim 4 further comprising maintaining a mirror version of the local virtual memory.

6. A wireless terminal comprising:
   a memory, which in an on-line mode occurring when there exists a session over an active link between the wireless terminal and a server, is adapted to be treated as local virtual memory by an application program running on the server to read and write data in the virtual memory related to the application program;
   a local application program on the wireless terminal, which in an off-line mode occurring when there does not exist a session over an active link between the wireless terminal and the server, has read and write access to the data in the memory; and
   wherein in the off-line mode, when the application program running on the server modifies data at the server, the application program running on the server thereafter establishes a data session with the wireless terminal and updates corresponding data in the virtual memory, and when the local application program modifies particular data in the virtual memory the local application program initiates a data session with the server and outputs a message to the server, the message comprising updates for at least some of the particular data.

7. A wireless terminal in accordance with claim 6 further comprising a plurality of keys having dynamically redefinable functions wherein the local application program specifies softkey labels identifying a respective function defined by the application program for at least one of the keys, the local application program comprising the functions defined for at least one of the keys.

8. A wireless terminal in accordance with claim 7 wherein the local functions comprise at least one function which when executed automatically instigates the establishment of a new connection to the server if one is not already in existence.

* * * * *